(12) United States Patent
Krishnamurthy et al.

(10) Patent No.: US 8,726,289 B2
(45) Date of Patent: May 13, 2014

(54) STREAMING ATTACHMENT OF HARDWARE ACCELERATORS TO COMPUTER SYSTEMS

(75) Inventors: Rajaram B. Krishnamurthy, Wappingers Falls, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 12/035,517

(22) Filed: Feb. 22, 2008

(65) Prior Publication Data

US 2009/0217266 A1 Aug. 27, 2009

(51) Int. Cl.
*G06F 9/46* (2006.01)
*G06F 15/173* (2006.01)
*G06F 15/16* (2006.01)
*G06F 9/50* (2006.01)
*H04L 29/06* (2006.01)

(52) U.S. Cl.
CPC ............ *G06F 9/5027* (2013.01); *H04L 65/605* (2013.01)
USPC ............ 718/104; 718/100; 709/226; 709/231

(58) Field of Classification Search
None
See application file for complete search history.

(56) References Cited

U.S. PATENT DOCUMENTS

| | | | |
|---|---|---|---|
| 5,859,988 A | 1/1999 | Ajanovic et al. | |
| 5,872,993 A * | 2/1999 | Brown | 712/35 |
| 6,061,754 A | 5/2000 | Cepulis et al. | |
| 6,145,043 A | 11/2000 | Sych et al. | |
| 6,216,173 B1 * | 4/2001 | Jones et al. | 715/705 |
| 6,298,370 B1 | 10/2001 | Tang et al. | |
| 6,317,803 B1 | 11/2001 | Rasmussen et al. | |
| 6,622,177 B1 | 9/2003 | Eilert et al. | |
| 6,772,218 B1 | 8/2004 | Noel, Jr. et al. | |
| 6,912,493 B1 | 6/2005 | Scheel et al. | |
| 6,961,794 B2 | 11/2005 | Atherton et al. | |
| 6,999,894 B2 | 2/2006 | Lin et al. | |
| 7,093,147 B2 | 8/2006 | Farkas et al. | |
| 7,103,695 B2 | 9/2006 | Peil et al. | |
| 7,180,525 B1 * | 2/2007 | Naegle | 345/596 |
| 7,426,597 B1 | 9/2008 | Tsu et al. | |
| 7,600,155 B1 | 10/2009 | Nickolls et al. | |
| 7,619,629 B1 | 11/2009 | Danilak | |
| 7,664,882 B2 * | 2/2010 | Mohammed et al. | 709/250 |
| 8,042,184 B1 * | 10/2011 | Batenin | 726/24 |
| 2003/0028751 A1 * | 2/2003 | McDonald et al. | 712/34 |
| 2003/0041163 A1 * | 2/2003 | Rhoades et al. | 709/232 |
| 2003/0058247 A1 * | 3/2003 | Naegle | 345/501 |

(Continued)

FOREIGN PATENT DOCUMENTS

WO 2006112844 A1 10/2006

OTHER PUBLICATIONS z/Architecture Principles of Operation, International Business Machines Corporation, SA22-7832-05, Sixth Edition (Apr. 2007).

(Continued)

*Primary Examiner* — Abdullah Al Kawsar
*Assistant Examiner* — Tammy Lee
(74) *Attorney, Agent, or Firm* — Cantor Colburn LLP; Steven Chiu (57) ABSTRACT

A method of streaming attachment of hardware accelerators to a computing system includes receiving a stream for processing, identifying a stream handler based on the received stream, activating the identified stream handler, and steering the stream to an associated hardware accelerator.

15 Claims, 4 Drawing Sheets

(56) References Cited

U.S. PATENT DOCUMENTS

| | | |
|---|---|---|
| 2003/0126346 A1 | 7/2003 | Kuo |
| 2005/0046632 A1* | 3/2005 | Chiu et al. .................... 345/501 |
| 2005/0097305 A1* | 5/2005 | Doering et al. ............... 712/226 |
| 2005/0200627 A1 | 9/2005 | Desylva |
| 2005/0273772 A1* | 12/2005 | Matsakis et al. .............. 717/136 |
| 2005/0278502 A1* | 12/2005 | Hundley ......................... 712/34 |
| 2006/0064546 A1 | 3/2006 | Arita et al. |
| 2006/0167966 A1 | 7/2006 | Kumar et al. |
| 2006/0200802 A1 | 9/2006 | Mott et al. |
| 2006/0294321 A1 | 12/2006 | Mehta |
| 2007/0074004 A1 | 3/2007 | Wong et al. |
| 2007/0157211 A1 | 7/2007 | Wang et al. |
| 2007/0168646 A1 | 7/2007 | Collard et al. |
| 2007/0169059 A1 | 7/2007 | Halambi et al. |
| 2008/0028408 A1 | 1/2008 | Day et al. |
| 2008/0120626 A1* | 5/2008 | Graffagnino et al. ......... 719/320 |
| 2008/0165196 A1 | 7/2008 | Bakalash et al. |
| 2008/0211817 A1* | 9/2008 | Bakalash et al. .............. 345/505 |
| 2009/0049451 A1 | 2/2009 | Bates |
| 2011/0072234 A1 | 3/2011 | Chinya et al. |

OTHER PUBLICATIONS

Theo Ungerer et al., "A Survey of Processors with Explicit Multithreading", ACm Computing Surveys, vol. 35, No. 1, Mar. 2003, pp. 29-63.

Rudrajit Samanta et al., "Hybrid Sort-First and Sort-Last Parallel Rendering with a Cluster of PCs", pp. 97-108.

Manjunath Kuslar et al., "Streamroller: Automatic Synthesis of Prescribed Throughput Accelerator Pipelines", Codes +ISSS'06, Oct. 22-25, 2006, Seoul, Korea, pp. 270-275.

Non-Final Office Action dated Nov. 8, 2011 for U.S. Appl. No. 12/035,511.

Non-Final Office Action dated Jun. 9, 2011 for U.S. Appl. No. 12/035,511.

* cited by examiner

STREAMING ATTACHMENT OF HARDWARE ACCELERATORS TO COMPUTER SYSTEMS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Generally, example embodiments of the present disclosure relate to hardware accelerators, and more particularly to providing a method, system, and computer program product for streaming attachment of hardware accelerators to computing systems.

General purpose processors like Intel®, AMD® and IBM POWER® are designed to support a wide range of workloads. If processing power beyond existing capabilities are required then hardware accelerators may be attached to a computer system to meet requirements of a particular application. Examples of hardware accelerators include FPGAs (Field Programmable Gate Arrays), the IBM Cell B.E. (broadband engine) processor, and graphics processing units (GPUs). Hardware accelerators are typically programmable to allow specialization of a hardware accelerator to a particular task or function and consist of a combination of software, hardware, and firmware. Such hardware accelerators may be attached directly to the processor complex or nest, by PCI-express (peripheral component interconnect) IO (input-output) slots or using high-speed networks, for example, Ethernet and Infiniband®.

Call-return programming models are typically used for accelerator attachment to high-end computing systems. In the call-return programming model, a processing unit (PU) may make a call to an accelerator with task blocks (task descriptors), parameters and/or input data blocks. The PU may wait until a reply or result is received. An accelerator run-time system on the PU usually generates a task block for a given input block of data directed to the accelerator. The task block and data may then be passed to the accelerator for processing. This works well if the input data block size is bounded. Creating a task block for every byte of data (e.g., for stream processing) to be processed on an accelerator may be prohibitive and may create undue overhead if the length of the stream is unknown. Therefore, call-return programming models are inefficient for streaming data.

For example, a stream residing on a disk may be several gigabytes in length and may be expected to approach terabytes or even larger in future workloads. A runtime system for streaming accelerator attachments may directly pass bytes to stream processing handlers on the accelerator for processing. Task blocks should be generated once for the entire stream and do not have to be generated for each byte or bit requiring accelerator processing.

However, call-return programming models may not be equipped to handle an external stream entering an accelerator connected to a high-end computing system. Data about the stream does not exist on the high-end computing system and may not be used in a call to the accelerator for stream-based processing. For example, several large workloads may consist of streams arriving externally at an accelerator and subsequently being forwarded to the high-end computing system for archival, storage, and further processing.

Therefore, with streaming workloads likely to become ubiquitous in the future, a new method to handle accelerators attached to high-end computing systems for stream processing may be prudent.

BRIEF SUMMARY OF THE INVENTION

An example embodiment includes a method of streaming attachment of hardware accelerators to a computing system. The method includes receiving a stream for processing, identifying a stream handler based on the received stream, activating the identified stream handler, and steering the stream to an associated hardware accelerator.

Another example embodiment includes a method of streaming attachment of hardware accelerators to a computing system. The method includes receiving a stream for processing, activating a stream handler associated with the stream, and processing the stream at an associated hardware accelerator.

Another example embodiment includes computer program product including a computer readable medium with program segments for, when executed on a computer device, causing the computer device to implement a method of streaming attachment of hardware accelerators to a computing system. The method includes receiving a stream for processing, identifying a stream handler based on the received stream, activating the identified stream handler, and steering the stream to an associated hardware accelerator.

A further example embodiment includes computer program product including a computer readable medium with program segments for, when executed on a computer device, causing the computer device to implement a method of streaming attachment of hardware accelerators to a computing system. The method includes receiving a stream for processing, activating a stream handler associated with the stream, and processing the stream at an associated hardware accelerator.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An example embodiment of the present invention provides association of a stream handler with every stream. As set forth herein, a stream handler may have different streams as inputs. A stream handler may be activated or loaded on an accelerator by a processing unit on a computing system. The methodologies provided steering of streams to the stream handler from the processing unit for disk-sourced streams, and steering to the computing system for storage and other processing for externally sourced streams, through the use of tabular data entries directing particular streams to associated accelerators. In this manner, front-end processing is reduced thereby increasing the efficiency of stream handling. Therefore, example embodiments of the present invention provide the technical benefit of overcoming drawbacks of call-return programming models as described hereinbefore.

Figure 1:
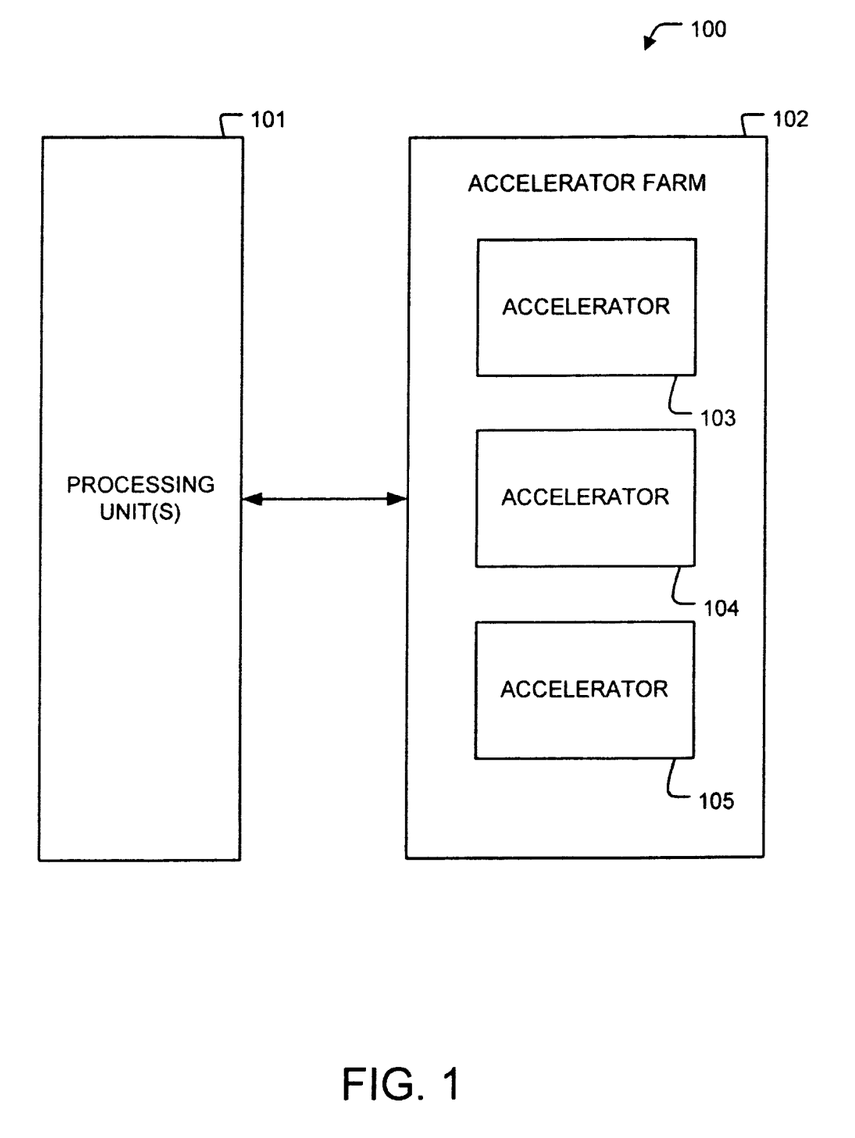
FIG. 1 illustrates a computing system including hardware accelerators, according to an example embodiment.

Turning to FIG. 1, a computing system 100 including hardware accelerators is illustrated. The system 100 includes processing unit(s) 101 and accelerator farm 102. The processing unit(s) 101 may be computer processors or entire processing units including computer processors, data buses, memory, and/or co-processing units. It is noted that one or more processing units may be included in parallel or in any suitable configuration. The processing unit(s) 101 may be matched (i.e., somewhat similar processors configured to operate at synchronized clock speeds with similar cache sizes), or may be processing units of different types, speeds, etc.

The accelerator farm 102 may include a plurality of hardware accelerators 103, 104, and 105. It is noted that any number of accelerators may be included, and example embodiments should not be limited to any particular number. The orientation and number of hardware accelerators illustrated is for understanding an example composition of a computing system only.

The processing unit(s) 101 may receive disk-sourced or internally sourced streams. For example, a disk-sourced stream may be associated with a stream handler. The stream handler may be an accelerator based function which inputs data of a predefined or desired format and size. The handler then outputs processed information accordingly. A direction table may be used to associate a stream name or type with a stream handler, and further, may associate a stream with a particular accelerator of the accelerator farm 102. The direction table may include information related to location of a stream handler or appropriate accelerator, and may identify whether or not the stream handler may be activated by the processing unit(s) 101, or by the appropriate accelerator of the accelerator farm 102. Any tabular format may be used, however, an example table is described more fully below with reference to externally-sourced streams. It is noted that a somewhat similar or even the same table may be used for both internally and externally sourced streams.

As noted above, the accelerator farm 102 may receive externally sourced streams including blocks of data and/or information for processing. For example, a front-end processing element (e.g., a port filter or port mirror in a switch operatively connected to the accelerator farm 102 (or simply a processor with memory) may steer a stream to an accelerator (e.g., 103, 104, 105) or broadcast a stream to every accelerator in the accelerator farm 102. It is noted that a broadcasting approach eliminates the need for a front-end processing element. It will be understood that the broadcasting is required until the accelerator handling the stream is identified. Alternatively, in a connection-oriented streaming system, the connection setup protocol may determine the accelerator capable of processing the stream by broadcasting the setup control message to every accelerator. An accelerator capable of processing the stream can accept the connection setup message to process the incoming stream. A stream may be steered to a particular accelerator using a look-up table on the processing units 101 or front-end processing element for 102. For example, entries in the look-up table may correspond to particular accelerators. The entries may include accelerator identification, location within the accelerator farm 102, and/or other pertinent information. The Table 1, provided below as an example table only, sets forth a tabular format which may be used to steer externally sourced streams to accelerators of the accelerator farm 102, or internally-sourced streams from the processing unit(s) 101:

TABLE 1

| Identifier | Stream Type | Handler | Accelerator |
|---|---|---|---|
| 0 | Type B | Handler B | Accelerator Location C |

As set forth in example Table 1, entry "0" of the table includes a stream of Type B, a handler B for this stream, and an accelerator identification including a location C of the appropriate accelerator. It is noted that other terminology may be equally suitable for example embodiments. Furthermore, more table columns or less table columns may be appropriate based on any particular implementation. Further, more tabular columns may be included to describe particular accelerator identification (e.g., serial number, type, IP address, PCI device number etc), to describe particular information about the stream (e.g., stream data size, length, time of receipt, etc), and to describe particular information about the stream handler (location on disk, location in memory, etc). Therefore, example embodiments should not be limited to only the tabular form described above.

Using a look-up table (e.g., Table 1) an externally sourced or internally sourced stream may be steered to a corresponding accelerator of the accelerator farm 102. If the stream reaches the intended accelerator, it may include destination information for the output of the stream handler. The destination information may be stored in tabular format somewhat similar to Table 1 within the stream handler or the appropriate accelerator. Alternatively, the appropriate accelerator may poll or query the processing unit(s) 101 for destination information. Hereinafter, example methodologies of streaming attachment of hardware accelerators are provided with reference to FIGS. 2 and 3.

Figure 2:
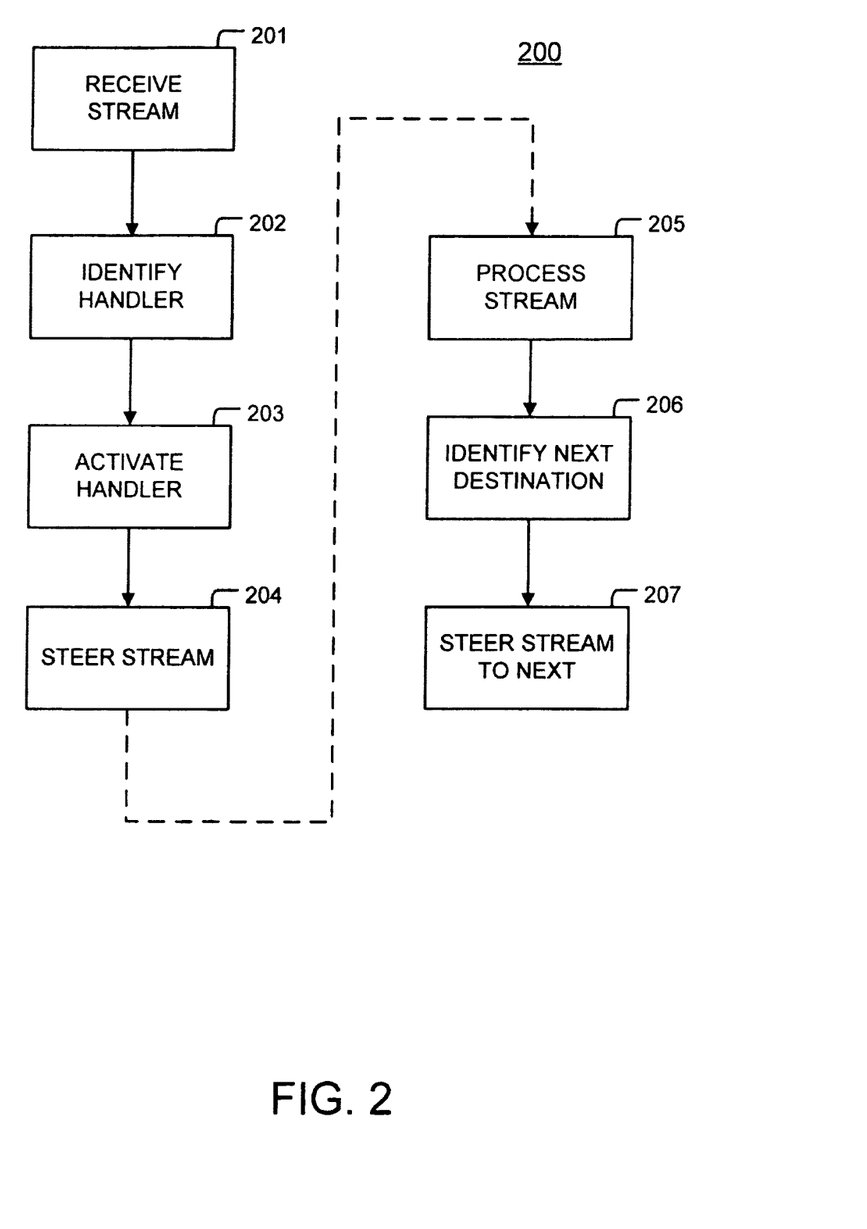
FIG. 2 illustrates a method for streaming attachment of hardware accelerators to computing systems, according to an example embodiment.

FIG. 2 illustrates a method for streaming attachment of hardware accelerators to computing systems, according to an example embodiment. As illustrated, the method 200 includes receiving a stream at block 201. For example, the stream may be an internally sourced stream originating from a disk or storage device of a computing system. The method 200 further includes identifying a stream handler at block 202. For example, a look-up table may be used to associate a stream (e.g., internally sourced stream) to a stream handler based on stream name and stream type. Upon identifying the stream handler, the method 200 includes activating the stream handler at block 203. For example, a processing unit of a computing system may activate a stream handler on an accelerator for further processing by an accelerator. It will be understood that the stream handler may be transferred by the processing unit to the accelerator or simply activated on the accelerator by use of a suitable control message from the processing unit. Activation is possible because the stream handler already exists in the memory of the accelerator and has been pre-loaded. Upon stream handler activation, the method 200 includes steering the stream (associated with the stream handler) to an appropriate accelerator for processing at block 204. For example, the stream handler may include a look-up table, which before or after activation, may be used to associate the stream handler with an appropriate accelerator. It is noted that blocks 202 and 203 may be performed opposite to the description above, or in parallel. For example, a stream handler may need to be activated by an appropriate accelerator rather than the processing unit. Therefore, the method 200 may also include steering the stream to the appropriate accelerator, and subsequently activating the stream handler at the appropriate accelerator. It will be understood that in a connection-oriented system, the connection setup process may perform steps 202 and 203. After connection setup is completed, the stream may be steered to the appropriate accelerator and corresponding handler.

Turning back to FIG. 2, the method 200 further includes processing the stream at block 205. The stream may be processed by the appropriate accelerator to which the stream is steered. Upon processing the stream, the method 200 includes identifying the next destination at block 206. The accelerator processing the stream may identify an additional accelerator or destination for the stream after processing. Upon identifying this next destination, the accelerator may steer the stream to the next destination (e.g., see block 207). Therefore, example embodiments provide a method for streaming attachment of accelerators in a computing system. As described above, the method 200 may be termed an "activate and steer protocol" (see blocks 203 and 204). The method 200 may be used to steer internally-sourced streams of a computing system. However, example embodiments are not limited to only internally sourced streams. A method of streaming attachment of accelerators (e.g., for externally sourced streams) is described below with reference to FIG. 3.

Figure 3:
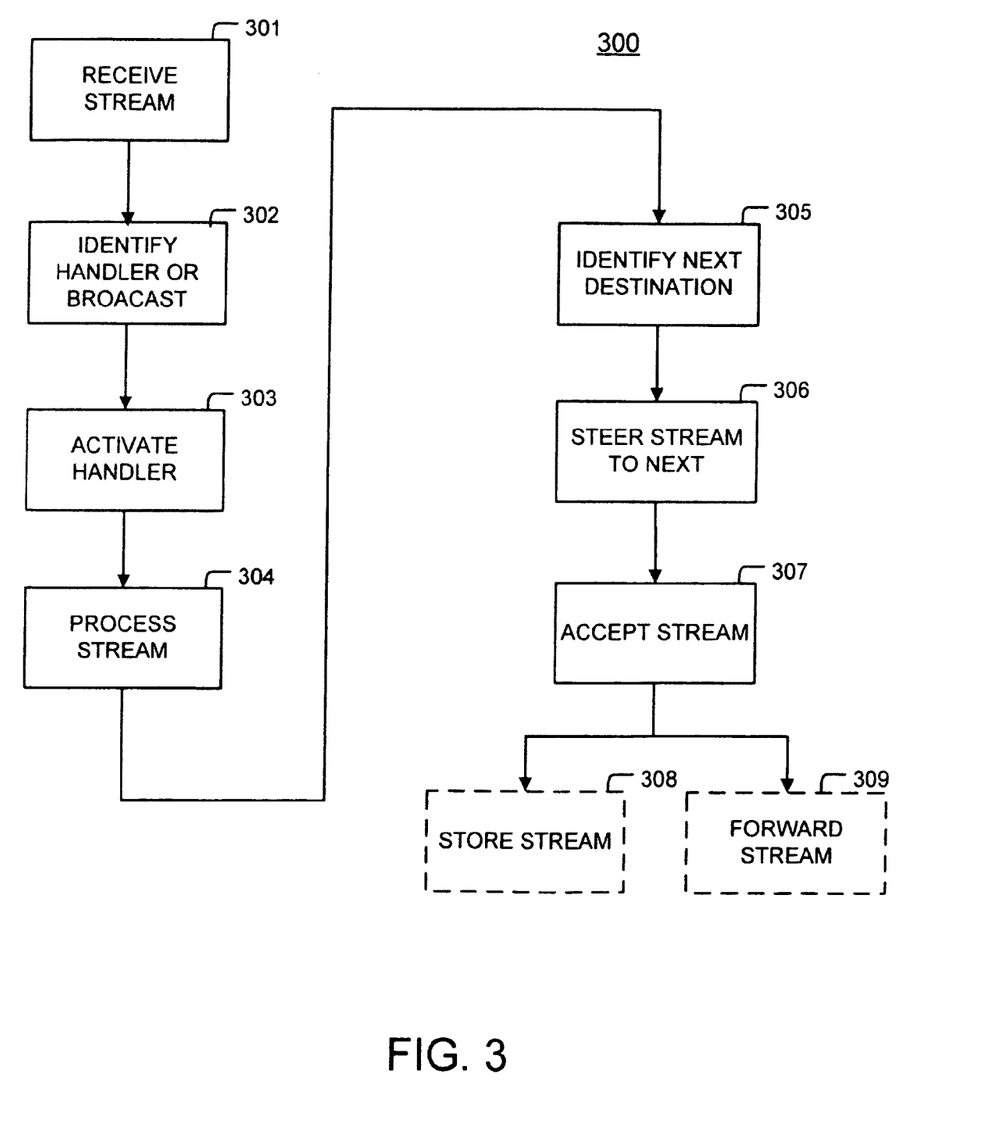
FIG. 3 illustrates a method for streaming attachment of hardware accelerators to computing systems, according to an example embodiment.

FIG. 3 illustrates a method for streaming attachment of hardware accelerators to computing systems, according to an example embodiment. The method 300 may include receiving a stream at block 301. For example, the received stream may be an externally sourced stream received by an accelerator farm of a computing system. Upon receipt of the stream, the method 300 includes identifying a stream handler at block 302. If a stream handler is not identified, the method 300 further includes broadcasting the stream at block 302.

Upon identifying the stream handler or broadcasting the stream, an appropriate accelerator may both activate the handler and process the stream (see blocks 303 and 304). For example, the appropriate accelerator may be identified through use of a look-up table, and the appropriate accelerator may activate a handler and process the stream. Upon processing the stream, the appropriate accelerator may identify a next destination at block 305. The accelerator processing the stream may identify an additional accelerator or destination for the stream after processing. Upon identifying this next destination, the accelerator may steer the stream to the next destination (e.g., see block 306). The receiving destination (e.g., an accelerator or processing unit) may accept the stream for further processing or storage (see block 307). If the stream is to be stored, the method 300 includes storing the stream at block 308. Alternatively, if the stream is to be forwarded to an additional destination, the method 300 includes forwarding the stream at block 309. As described above, the method 300 may be termed a "steer and forward protocol" (see blocks 306 and 309). The method 300 may be used to steer externally-sourced streams of a computing system. For a connection-oriented system, the connection setup protocol may follow the steps of method 300. In such a scenario, the connection setup process may activate a stream handler on the accelerator. Alternatively, the connection setup control message may be broadcast to all accelerators. If an accelerator accepts the connection setup control message, subsequent stream data may be directly steered to that accelerator.

Figure 4:
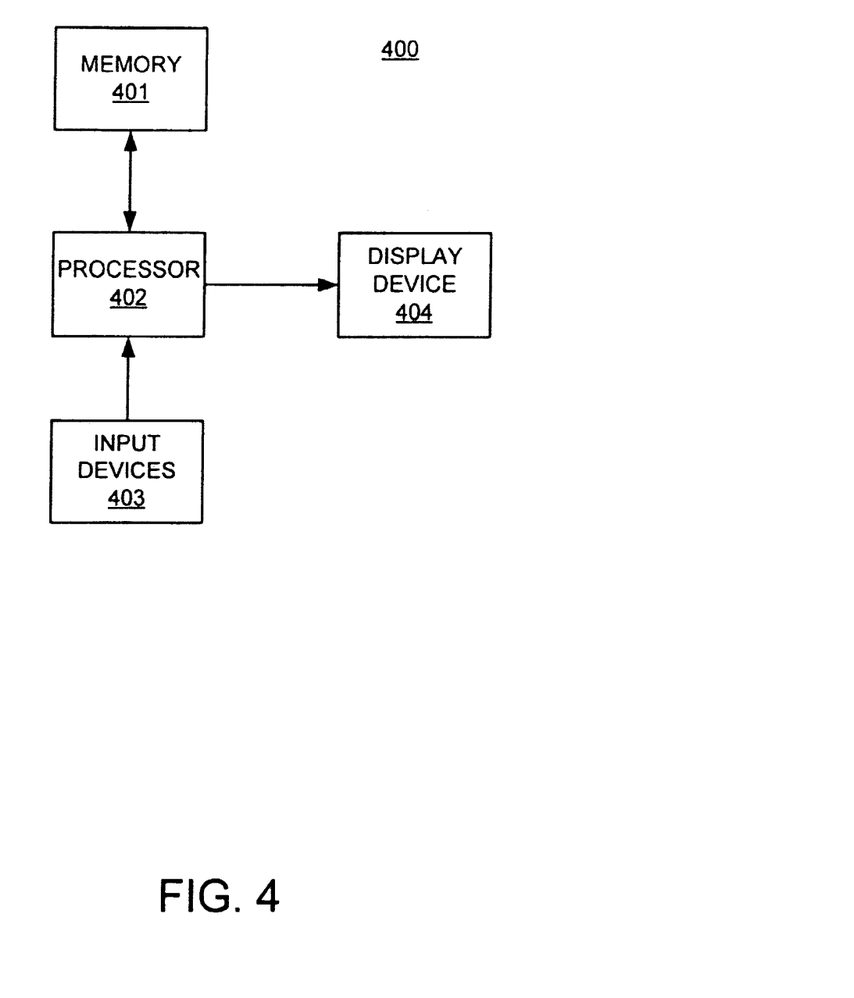
FIG. 4 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 4 illustrates a computer apparatus, according to an exemplary embodiment. Therefore, portions or the entirety of the methodologies described herein may be executed as instructions in a processor 402 of the computer system 400. The computer system 400 includes memory 401 for storage of instructions and information, input device(s) 403 for computer communication, and display device 404. Thus, the present invention may be implemented, in software, for example, as any suitable computer program on a computer system somewhat similar to computer system 400. For example, a program in accordance with the present invention may be a computer program product causing a computer to execute the example methods described herein.

The computer program product may include a computer-readable medium having computer program logic or code portions embodied thereon for enabling a processor (e.g., 402) of a computer apparatus (e.g., 400) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

The invention claimed is:

1. A method of streaming attachment of hardware accelerators to a computing system, comprising:
   receiving a stream for processing;
   broadcasting the stream to every hardware accelerator of an accelerator farm;
   based upon a hardware accelerator accepting the stream, discontinuing broadcasting the stream to every hardware accelerator of the accelerator farm;
   identifying a stream handler in the computing system based on the hardware accelerator that accepted the stream;
   activating the identified stream handler;
   steering the stream to only the hardware accelerator that accepted the stream;
   processing the stream at the hardware accelerator that accepted the stream;
   the hardware accelerator that accepted the stream identifying a next hardware accelerator of the processed stream from a look-up table including a plurality of tabular entries; and
   steering the processed stream to the next hardware accelerator.

2. The method of claim 1, wherein the stream is an internally sourced stream originating from a storage device of the computing system.

3. The method of claim 1, wherein identifying the stream handler includes:
   retrieving stream handler information for the stream from the look-up table.

4. The method of claim 3, wherein:
   each tabular entry of the plurality of tabular entries includes information pertaining to a type of stream, an identification of an appropriate stream handler, and the location of the next hardware accelerator.

5. The method of claim 1, wherein steering the stream includes forwarding the stream and stream handler to the accelerator farm including the hardware accelerator that accepted the stream.

6. The method of claim 1, wherein activating the stream handler includes one of:
   activating the stream handler at a processing unit of the computing system;
   transferring the stream handler from the processing unit to the hardware accelerator that accepted the stream and activating the stream handler at the hardware accelerator that accepted the stream; and
   activating a pre-loaded stream handler at the hardware accelerator that accepted the stream.

7. A method of streaming attachment of hardware accelerators to a computing system, comprising:
   receiving a stream for processing;
   broadcasting the stream to every hardware accelerator of an accelerator farm;
   based upon a hardware accelerator accepting the stream, discontinuing broadcasting the stream to every hardware accelerator of the accelerator farm;
   identifying a stream handler in the computing system based on the hardware accelerator that accepted the stream;
   activating a stream handler in the computing system associated with the stream;
   processing the stream by the hardware accelerator that accepted the stream;
   the hardware accelerator that accepted the stream identifying a next hardware accelerator of the processed stream from a look-up table including a plurality of tabular entries; and
   steering the processed stream to the next hardware accelerator.

8. The method of claim 7, further comprising:
   identifying the associated stream handler; and
   steering the stream to the hardware accelerator that accepted the stream.

9. The method of claim 8, wherein identifying the stream handler includes:
   retrieving stream handler information for the stream from the look-up table.

10. The method of claim 9, wherein:
    each tabular entry of the plurality of tabular entries includes information pertaining to a type of stream, an identification of an appropriate stream handler, and the location of the next hardware accelerator.

11. The method of claim 7, further comprising:
    accepting the stream at the a next hardware accelerator.

12. The method of claim 11, wherein accepting the stream includes one of storing the stream at the next hardware accelerator and forwarding the stream to a further destination.

13. The method of claim 7, wherein the stream is an externally sourced stream originating external to the computing system.

14. The method of claim 7, wherein activating the stream handler includes activating the stream handler at the appropriate hardware accelerator.

15. A computer program product including a non-transitory computer readable medium with program segments for, when executed on a computer device, causing the computer device to implement a method of streaming attachment of hardware accelerators to a computing system, the method comprising:

receiving a stream for processing;

broadcasting the stream to every hardware accelerator of an accelerator farm based upon a hardware accelerator accepting the stream, discontinuing broadcasting the stream to every hardware accelerator of the accelerator farm;

identifying a stream handler in the computing system based on the hardware accelerator that accepted the stream;

activating the identified stream handler;

steering the stream to only the hardware accelerator that accepted the stream;

processing the stream at the hardware accelerator that accepted the stream;

the hardware accelerator that accepted the stream identifying a next hardware accelerator of the processed stream from a look-up table including a plurality of tabular entries; and     steering the processed stream to the next hardware accelerator.

\* \* \* \* \*